Patented Aug. 4, 1925.

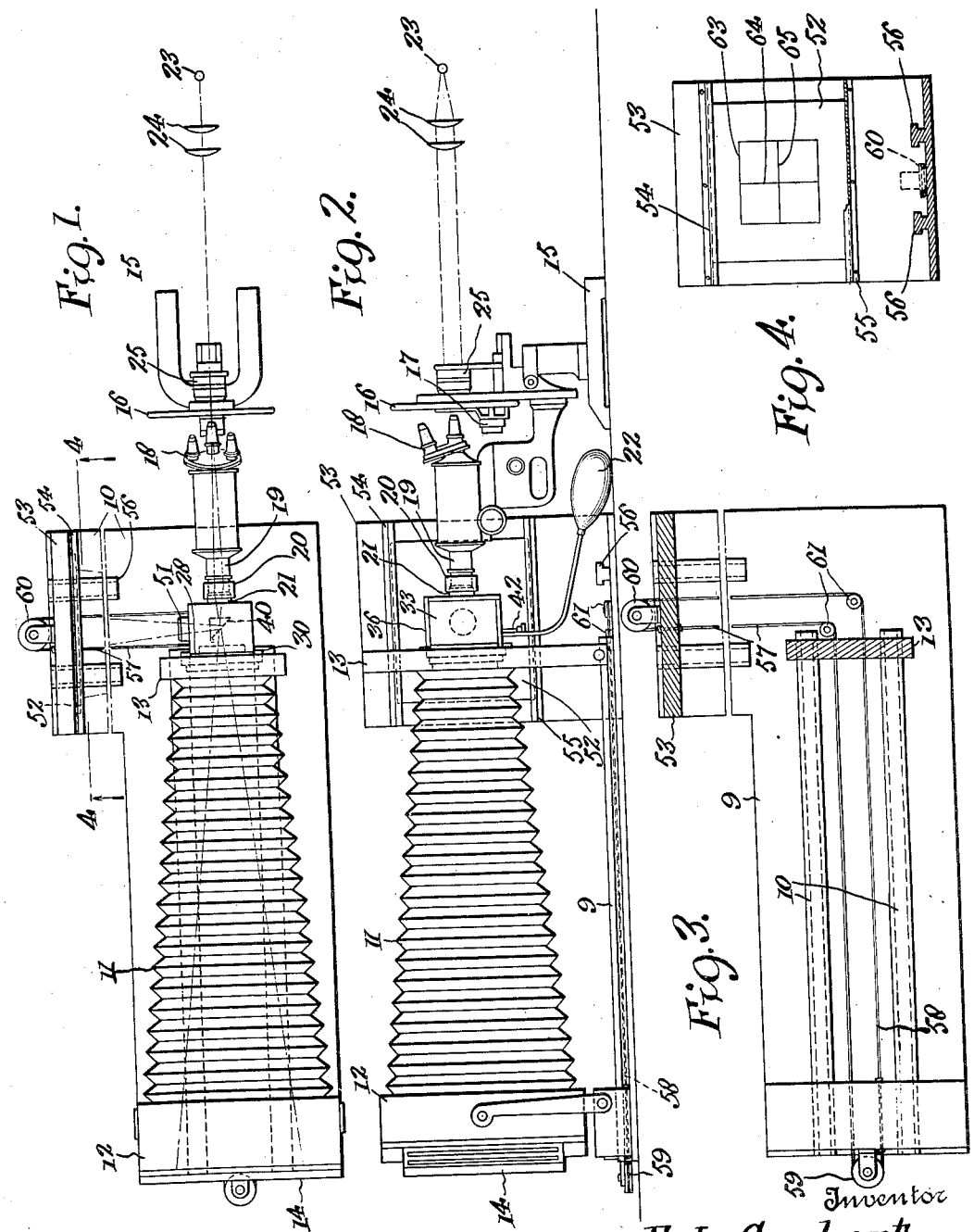

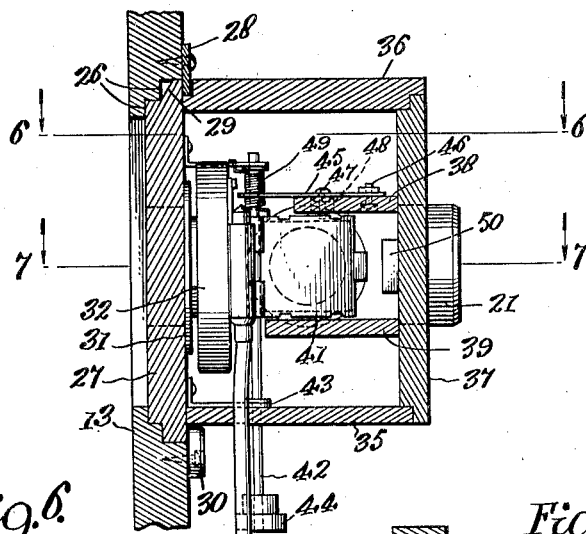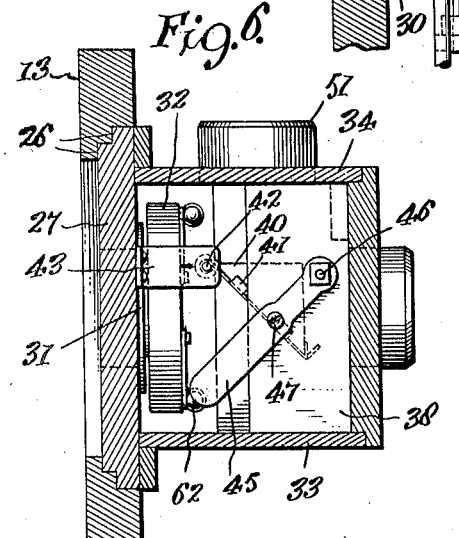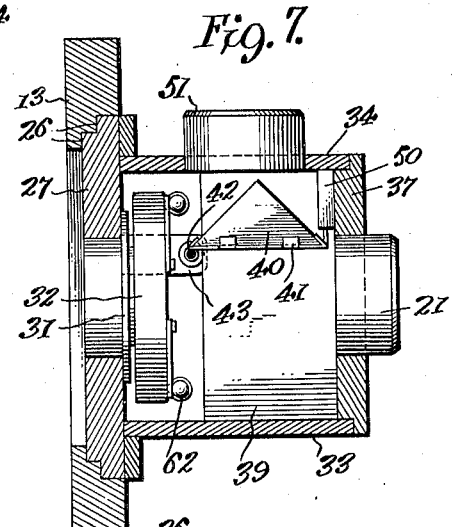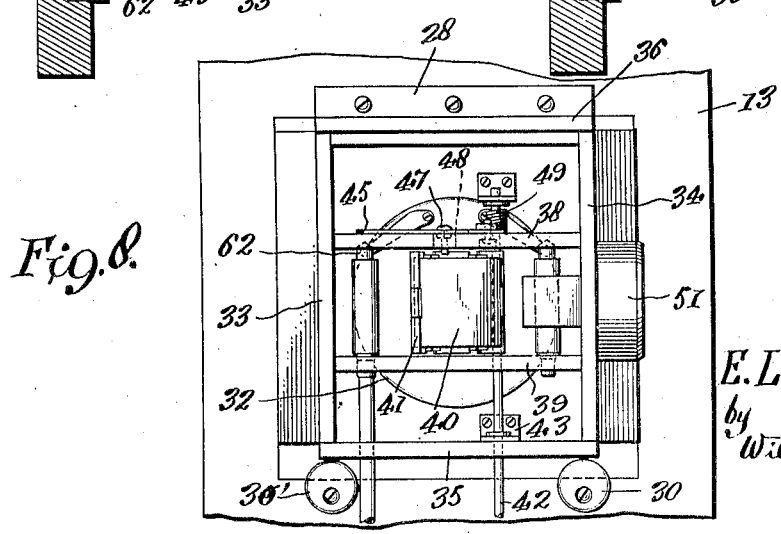

1,548,675

UNITED STATES PATENT OFFICE.

EVERETT LE ROY GAYHART, OF WASHINGTON, DISTRICT OF COLUMBIA.

ATTACHMENT FOR PHOTOMICROGRAPHIC CAMERAS.

Application filed November 19, 1924. Serial No. 750,866.

*To all whom it may concern:*

Be it known that I, EVERETT LE ROY GAYHART, a citizen of the United States, residing at Washington, in the District of Columbia, have invented certain new and useful Improvements in Attachments for Photomicrographic Cameras; and I do hereby declare the following to be a full, clear, and exact description of the invention, such as will enable others skilled in the art to which it appertains to make and use the same.

The present invention relates to improvements in photomicrographic camera and has for an object the provision of means to permit a real image formed by the microscope, of the same size as that which will later be formed upon the photographic plate, to be continuously under visual examination up to the moment of the exposure without loss of light intensity when projected on the sensitized plate.

The present procedure consists in projecting the image upon the focusing screen of the camera. When the adjustment of the image as to position and accuracy of focus has been completed to the satisfaction of the operator a shutter is closed obstructing or occulting the path of light from the microscope and the plate holder inserted in the back of the camera. The slide of the plate holder is then drawn and the exposure made by opening and closing the shutter.

The difficulties inherent with this method are first that the insertion of the plate holder in the camera after adjustment of the image has been completed involves risk of jarring the mechanism and destroying the accuracy of this adjustment and in the second place a certain time interval is required to insert the plate holder and prepare the camera for the exposure. In case an attempt is made to photograph a living object there is a strong probability that the object will move out of the field of the microscope during the time that the plate holder is being inserted and before the exposure is made and the operator has no assurance that the conditions have remained the same as at the moment when he last examined the image upon the screen.

Various attempts have been made to overcome this difficulty notably in the U. S. Patent No. 1,470,770 granted October 16, 1923, to Henry Siedentopf. In this patent the operator observes a virtual image through an eye piece and has no ready indication as to the degree of magnification or of the relative size of the image with respect to the area of the plate. Furthermore a certain loss of light is involved due to the absorption of the prism used in this invention which prism is constantly in the path of light, as well as due to the fact that only a fraction of the light is diverted by the ray dividing surface employed in this invention.

Another attempt to correct this situation is made in the U. S. Patent No. 1,433,877, granted October 31, 1922, to W. G. Exton in which the same objection obtains as to the present normal method of procedure in photomicrography. This latter invention requires the substitution of a plate holder in the plane of the focusing screen after the necessary adjustments of the image as to focus and position have been completed and further there is a certain loss of light intensity due to absorption in the prism which is constantly in the path of light.

According to a further attempt at the solution of this problem contained in the U. S. Patent No. 1,315,105, granted September 2, 1919, to S. Firgueroa, a mirror was interposed in the path of light and this is objectionable in that the mirror is interposed between the shutter and the sensitized plate and the shutter must be closed and a light tight closure made at the joint where the reflected rays pass out of the camera before the slide of the plate holder can be drawn. This involves the same loss of time and risk of disturbing adjustment as obtains with the present method.

In the U. S. Patent No. 1,161,556, granted November 23, 1915, to R. L. Watkins it is pointed out that a binocular microscope may be employed for projecting images, one eye piece of the microscope being used for projection and the other eye piece available for continuous observation of the image. The same objection holds with this arrangement as in the case of the patent first cited, namely Siedentopf.

I am aware that in the present reflex camera, exemplified in U. S. Patent No. 923,827, granted June 8, 1909, to W. F. Folmer combined mirrors and shutters have been used for the purpose of observing the object just prior to exposing the plate but in such cases the viewing device forms an integral part of the camera and the mirrors are large and ponderous, being placed close to the plate, as a result of which considerable difficulty has been experienced in securing adequate means for preventing the vibration of the camera incident to the impact of the mirror against its abutment when swung clear of the shutter and plate.

Other objects of my invention are to provide a portable accessory for a photomicrographic camera that may readily be applied to existing apparatus permitting of the viewing of the image as aforesaid, in which the reflecting body is remote from the plate and is a small mass and consequently has little inertia with the result of reduced effect in causing vibration; and to provide an improved screen and adjustable screen holder for viewing the reflected image.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of a photomicrographic assembly with the improved device applied thereto.

Figure 2 is a side elevation of the same.

Figure 3 is a horizontal section showing the camera bed with the device for maintaining the auxiliary focusing screen constantly at the same distance from the microscope projection ocular as the distance of the sensitized plate from the projection ocular.

Figure 4 is a vertical section taken on the line 4—4 in Figure 1.

Figure 5 is a vertical section taken through the lens board and associated mechanism.

Figure 6 is a horizontal section taken on the line 6—6 in Figure 5.

Figure 7 is a similar view taken on the line 7—7 in Figure 6, and

Figure 8 is a front elevation of the lens board and associated mechanism with the front wall removed.

Referring more particularly to the drawings 9 represents the bed on which the assembly is mounted, this bed being substantially L-shaped in plan and having the camera bed 10 affixed thereto.

The bellows of the camera are indicated at 11 and the back frame at 12. Both the back frame 12 and the front camera frame indicated at 13 have a sliding movement along the camera bed 10. The plate holder of the camera is represented at 14 and is carried in the back frame 12 in a well known manner.

The foot of the microscope is shown at 15 and the stage upon which the specimen to be photographed is supported is indicated at 16. At 17 the knobs for actuating the mechanical stage are shown whereby the specimen mounted on the glass slide may be adjusted suitably in position within the field of the objective. A triple nose piece is indicated at 18 whereby any one of three objectives may be conveniently swung into use in the axis of the microscope. The draw tube in which the projection ocular is inserted is shown at 19. At 20 a light-tight collar is shown for the purpose of making a connection between the draw tube 10 and a projecting collar or sleeve 21 on the front face of the improved device which is substituted for the customary lens board and shutter of the standard camera.

This accessory device is illustrated in detail in Figures 5 to 8 inclusive and will be referred to. The release, which is shown for example to be a pneumatic release is indicated at 22. The illuminant is represented at 23 and the condensing system at 24. A substage condenser is represented at 25.

The substage condenser represented by 25 is used for the purpose of projecting an image of the illuminated disc of the condensing system 24 upon the front focal plane of the objective in which plane the object to be photographed lies.

All of the above parts with the exception of the L-shaped assembly base 9 and the device 21 are customary and to be found in standard apparatus for this purpose.

Referring more particularly to Figures 5 to 8, the front frame 13 of the camera is provided with the usual rabbets 26 for the purpose of holding the lens board 27. The rabbet arrangement is intended to exclude light along this joint. The upper inner edge portion of the lens board is bevelled off as indicated at 29 to facilitate the insertion of this lens board up beneath the metal retaining strip or plate 28 secured above the rabbeted opening in the frame 13 and overlapping a portion of this opening. At the lower edge of the lens board 27 are provided suitable rotary buttons 30 to removably retain this lower edge of the board in the rabbets. The lens board 27 carries the shutter 31 on the outside with reference to the camera and the release mechanism 32 is coupled to this shutter and to the release bulb 22 shown in Figure 2.

In accordance with the invention the shutter and its release mechanism together with the other operating parts of the device are enclosed in a casing supported upon and forwardly of the lens board 27 and removable, as a unit, with the lens board from the front frame on the camera. This casing comprises the lateral walls 33 and 34, the bottom 35, top or cover 36 and the front wall 37. The rear wall of this enclosing casing is constituted by the lens board 27. The device is affixed in any suitable manner to the lens board. The cover 36 is preferably made removable for the purpose of gaining ready access to the interior parts for permitting adjustment of the shutter and a rabbet joint is incorporated in this construction for the purpose of making a light-tight fitting.

Within the enclosure or casing are the two horizontal partial partitions 38 and 39 spaced apart substantially the diameter of the opening of the shutter. Between these partitions is received a movable reflecting body 40. For example in the present case the reflecting body is shown to be a prism, see particularly Figure 7 and the body is mounted in the holder 41 having a pivotal movement about the center or horizontal rod 42. This rod is journaled in appropriate brackets 43 affixed to the lens board or other parts of the enclosure and in the instance shown the axis of the rod 42 is substantially vertical so that the reflecting body partakes of a horizontal swinging movement. The rod 42 extends downwardly below the bottom 35 of the casing and is provided with an operating knob 44 for convenience in adjusting the reflecting body back to a position in front of the shutter and engaged with the latch device.

The latch is shown in this embodiment of the invention to comprise a flat spring 45 affixed as indicated at 46 to the upper face of the top partition 38. A detent 47 is carried by the intermediate portion of the spring 35 and extends down through an opening 48 made in the upper partition 38 and into the path of the lens holder 41. The spring 45 is normally biased to the lower position where the detent 47 will lie in the path of the prism holder 41 restraining the prism holder against movement. A coiled spring 49 is wound about the rod 42, whose effort is to swing the prism and its holder to the position shown in Figure 7, or in other words to one side of the path of light proceeding from the projection ocular to the sensitized surface of the plate held in the plate holder 14. The effort of the spring holds the free edge of the prism holder against the buffer stop 50. This stop may be cork, rubber or appropriate material to check the movement of the prism and prism holder without shock when released by the detent 47. The free end of the flat spring 45 overhangs the plunger 62 of the release mechanism whereby the spring and detent will be raised by the plunger upon operation of the release.

The lateral wall 34 is provided with a tube or sleeve 51 similar to the part 21 in the front wall 37. The part 51 acts as a light shade to impede the access of stray light from the room in which the device is operated and prevent it finding its way directly into the bellows of the camera when the shutter is opened. Also the prism or mirror 40 impedes the ingress of stray light through the opening in the wall 34. For the further purpose of reducing the possibility of stray light finding its way into the interior of the camera through the opening in wall 34 the entire interior of the device with the exception of the reflecting body is covered with a light absorbing paint or covering, for instance flat black paint.

When the prism or mirror is in the latched position, or the position shown in Figure 8 it will intercept the light rays proceeding from the microscope and reflect the same through the opening in the wall 34 and sleeve 51 to a screen 52 adjustably carried by the screen frame 53. This latter screen frame is mounted upon the angled portion of the main bed 9 of the assembly. The frame 53 is provided with horizontal guides 54 and 55 for slidably receiving the upper and lower edges of the screen 52 admitting of the screen sliding horizontally in a direction parallel to the axis of the microscope. The screen 52 will be perpendicular to the axis of the reflected rays.

This screen and screen frame or carrier are adjustable as a unit toward and from the prism or mirror along the axis of the reflected rays and this movement is preferably coordinated mechanically with the movement of the back frame 12 of the camera for the purpose of maintaining the screen and the sensitized surface constantly at equal distances from the eye point of the projection ocular (or in case no projection ocular is used, constantly at equal distances from the objective itself). In consequence of this maintenance of equal distance an image when focused upon the screen 52 will also be in focus upon the sensitized plate carried in the plate holder 14 upon swinging the reflecting body 40 aside from the path of light proceeding from the microscope regardless of the amount of the camera extension, i. e., distance from the sensitized surface of the plate to the eye point of the projection ocular.

To effect this relationship between the sensitized surface and auxiliary screen, I mount the screen holder 53 upon guides 56 carried upon the bed 9 and secure one run 57 of an endless cable to the holder 53 while affixing the opposite run 58 of the cable to the back frame 12 of the camera. As appears in Figure 3, the cable is trained at its ends over the pulleys 59 and 60 and is guided at its intermediate portions over the guide pulleys 61 which enable the cable to effect a substantially right angle turn. When the back frame 12 of the camera is shifted by a well known mechanism in such a way as to approach or recede from the microscope, the cable will be moved at the same time and cause corresponding movement in the screen holder although in a direction at right angles to the movement of said back frame.

In the operation of the device, the prism or mirror and its holder are normally initially in the position indicated in Figures 1, 5, 6 and 8 in which the reflecting body is in position to reflect the rays from the eye piece of the microscope upon the screen 52, forming an image thereon of the object upon the stage 16. The screen 52 may be either of opaque material or translucent material permitting the image to be viewed either by reflected light from the screen or transmitted light passing through the screen. The screen may be adjusted in the guides 54 and 55 from time to time as this adjustment becomes necessary. An area may be outlined upon the screen of the same shape and size as the area of the photographic plate and arranged in such a way that the image when falling upon this area of the screen will occupy the same position relative to the area as it occupies upon the plate when the rays are allowed to proceed directly to the plate. This area is indicated by the numeral 63 in Figure 4. For convenience in centering the reflected image upon this area, cross lines 64 and 65 may be drawn intersecting at right angles at the center of the area. The slidable screen 52 is then adjusted in the guides 54 and 55 to bring the intersection of these lines in the axis of the reflected rays. This change in position is necessitated by changes in the position of the camera front 13 required by differences in size and focal length of the objectives which in turn necessitates a difference in longitudinal position of the microscope body and its attached draw tube 19. The object can be viewed upon the screen up to the instant of taking the picture, and then by operating the release, as by squeezing the bulb 22, the prism or mirror is swung out of the path of light and immediately thereafter by the continuation of the motion of the release the shutter is caused to open and close effecting the exposure of the sensitized plate. This action takes place by virtue of the plunger 62 of the release being lifted into contact with the flat spring 45 and raising the detent 47 out of the path of the prism or mirror holder. As soon as the detent is withdrawn the coil spring 49 swings the holder 41 and reflecting body aside to the position shown in Figure 7 where it will not obstruct the path of light through the shutter to the sensitized plate.

The screen carrier 53 as previously explained is maintained by the continuous cord passing over pulleys 59, 60 and 61 at a distance from the eye piece that is constantly equal to the distance of the sensitized plate from the eye piece. As a consequence of this relation of constant equal distance, the adjustment of the position of screen holder 53 to control the size of image and thereby the degree of magnification constantly insures that the image will be equally in focus when projected upon the sensitized plate.

It will be appreciated that a device of this character furnishes a means of making photographs of living objects with celerity and assurance and facilitates photography of prepared specimens.

It is obvious that various changes and modifications may be made in the details of construction and design of the above specifically described embodiment of this invention without departing from the spirit thereof, such changes and modifications being restricted only by the scope of the following claims.

What is claimed is:—

1. In combination with a microscope, and a camera associated therewith, of a screen located adjacent the camera, and a reflecting body detachable from the camera and located between the camera and the microscope, intitially interposed in the path of light from the microscope to the sensitive film for reflecting the real image upon said screen, said reflecting body being movably mounted and adapted to be shifted out of the path of light from the microscope to the plate of the camera prior to operating the camera shutter.

2. In combination, a microscope, a camera associated therewith, a screen placed adjacent the camera, and a movably mounted reflecting body independent of the construction of the camera and detachable therefrom, said reflecting body being initially interposed in the path of light from the microscope and adapted to reflect a real image of the object on said screen and means associated with the release of the camera shutter for causing the shifting of said reflecting body out of the path of light from the microscope to the camera plate just prior to the operation of the shutter.

3. In combination with a microscope, and a camera having front and back frames with the plate holder carried by the back frame and a removable lens board and shutter carried by the front frame, of a reflecting body movably supported from said lens board in front of the shutter; means for biasing said reflecting body to a position out of the path of the light rays from the microscope through the shutter to the plate, and latch means positioned to be tripped by the shutter release for holding said reflecting body in position to intercept the rays of light from the microscope and divert same to one side from the shutter and camera.

4. In combination with a microscope, and a camera having adjustable front and rear frames with a plate holder carried by the rear frame and a shutter carried by the front frame, of a reflecting body movably supported in front of said shutter, means for biasing said reflecting body to the position out of the path of the rays from the microscope to the camera plate, a latch for holding said plate holder in position to intercept said rays and to reflect same to one side of the camera, a release for the shutter of the camera adapted to trip said latch, and a movable screen positioned to receive the real image reflected from said reflect body.

5. The combination with a camera having movable front and rear frames with a plate holder carried by the rear frame and a shutter and shutter release mechanism carried by the front frame, a movably mounted reflecting body supported in front of said shutter, means whereby said reflecting body is biased to a position out of the path of the release entering the camera, latch means for holding said reflecting body in position to intercept said rays, a screen for receiving the reflected rays from said body, and a holder for said screen coordinated for movement with the back frame of the camera.

6. In combination with a camera having front and rear movable frames with a plate holder carried by the rear frame and a shutter and shutter release mechanism carried by the front frame, of a screen holder mounted at one side of said camera for movement toward and from the camera, adjusting means for said screen holder coupled for actuation to the rear frame of the camera, a screen movably mounted in said screen holder, and a movable reflecting body placed in front of the camera shutter for initially reflecting on said screen a real image of the object to be photographed and adapted to be moved out of the path of the light rays before the shutter is operated.

7. In combination with a camera having a movable back frame with a plate holder therein and a movable front frame having a detachable lens board with the shutter and shutter release mechanism thereon, a casing carried forwardly upon said lens board and removable therewith, said casing having an opening in front thereof to admit rays from the object to the camera plate and with the opening in the side thereof to permit reflected rays to pass out, a pivotally mounted reflecting body in said casing, spring means for biasing said reflecting body to a position out of the path of the rays from the object, latch means in said casing for normally holding said reflecting body in a position to reflect a real image of the object out through the side opening of the casing, said latch means being positioned for tripping by said release mechanism.

EVERETT LE ROY GAYHART.